Jan. 2, 1923.

J. H. LETZ.
GRINDING MACHINE.
FILED AUG. 7, 1919.

J. H. LETZ.
GRINDING MACHINE.
FILED AUG. 7, 1919.

Witnesses:
W. F. Kilroy

Inventor:
John Holland Letz
By John Howard Letz
Atty.

Jan. 2, 1923.
1,440,475

J. H. LETZ.
GRINDING MACHINE.
FILED AUG. 7, 1919.

Witnesses:
W. F. Kilroy
Harry R. L. White

Inventor.
John Holland Letz
by John Howard McElroy
his Atty.

Jan. 2, 1923.

J. H. LETZ.
GRINDING MACHINE.
FILED AUG. 7, 1919.

Patented Jan. 2, 1923.

1,440,475

UNITED STATES PATENT OFFICE.

JOHN HOLLAND LETZ, OF CROWN POINT, INDIANA, ASSIGNOR TO THE LETZ MANUFACTURING COMPANY, OF CROWN POINT, INDIANA, A CORPORATION OF INDIANA.

GRINDING MACHINE.

Application filed August 7, 1919. Serial No. 315,869.

*To all whom it may concern:*

Be it known that I, JOHN HOLLAND LETZ, a citizen of the United States, and a resident of Crown Point, in the county of Lake and State of Indiana, have invented certain new and useful Improvements in Grinding Machines, of which the following is a full, clear, and exact specification.

My invention is concerned with what may be called a universal grinding machine, in that it is adapted to grind substantially all the food stuffs produced by the farmer, and it is designed to produce a device of the class described that shall be capable of being cheaply manufactured, and that shall at the same time be durable and efficient.

To this end, it consists in certain novel combinations of elements, all as will be fully described at length and particularly pointed out in the claims.

To illustrate my invention, I annex hereto six sheets of drawings in which the same reference characters are used to designate identical parts in all the figures, of which

Figure 1:
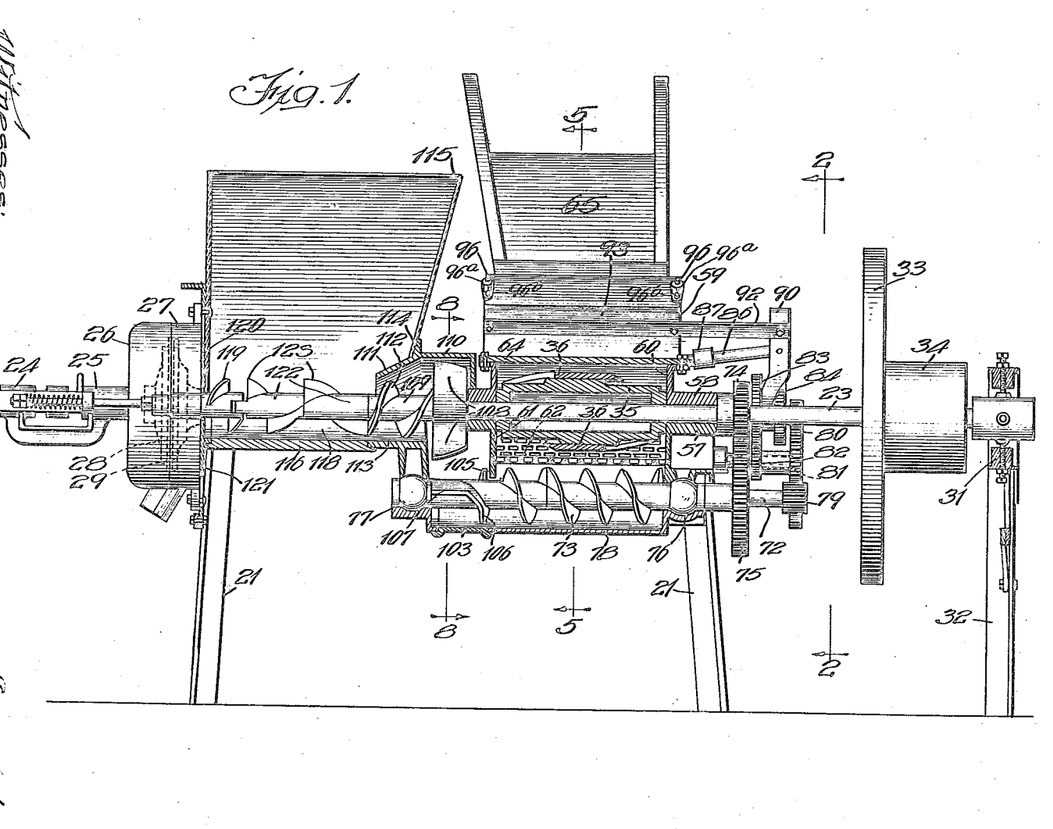
Fig. 1 is a side elevation of the machine with most of it in central vertical longitudinal section.
Figures 11, 12, 13, 14, 15:
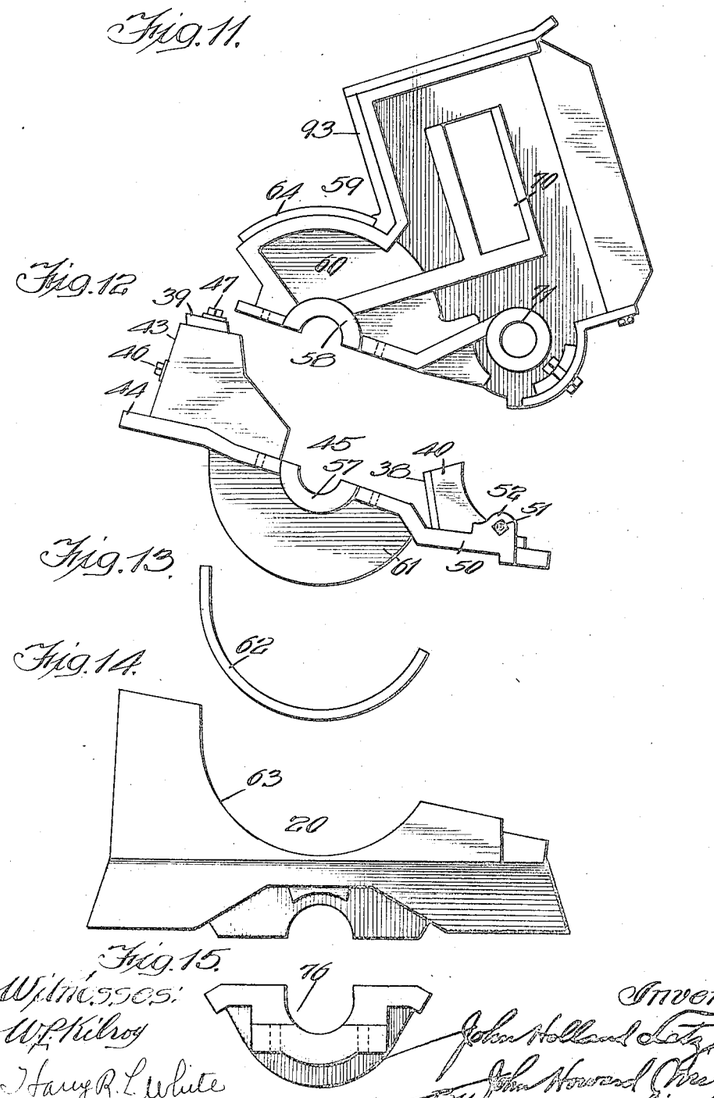
Fig. 11 is an end elevation of one of the end castings.
Fig. 12 is an end elevation of an intermediate frame casting.
Fig. 13 is an end elevation of a screen.
Fig. 14 is an end elevation of the main casting.
Fig. 15 is an end elevation of the trough casting, the six elements shown in Figs. 11 to 15 inclusive being shown in the same general relationship but separated to show the different parts more distinctly.
Figure 17:
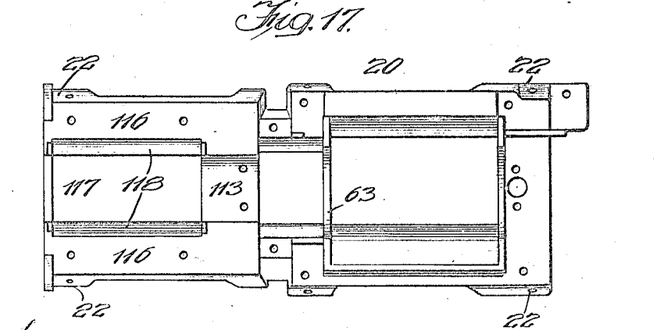
Fig. 17 is a top plan view of the main castings seen in end elevation in Fig. 14 but on a smaller scale.

The basis of the framework of my machine is a main frame or a concave casting 20, seen in top plan view in Fig. 17 and in right hand elevation on a larger scale in Fig. 14, this casting being supported upon the four legs 21 bolted to the four corners thereof upon the seats 22 formed thereon. The main shaft 23 is journaled at its left hand end in the bearings 24 and 25 carried by the cover cap 26 of the customary burr casing 27 bolted on to the end of the casting 20 and containing therein a rotating burr 28 secured on the shaft 23 and co-operating with a stationary burr 29 supported by trammels in the burr casing, the position of the two burrs being shown in dotted lines in Fig. 1. This burr casing, burrs and shaft bearings so far described may be of any desired construction, such for instance as is shown in my Patent No. 1,223,497, dated April 24, 1917.

Figures 5, 6, 7, 18:
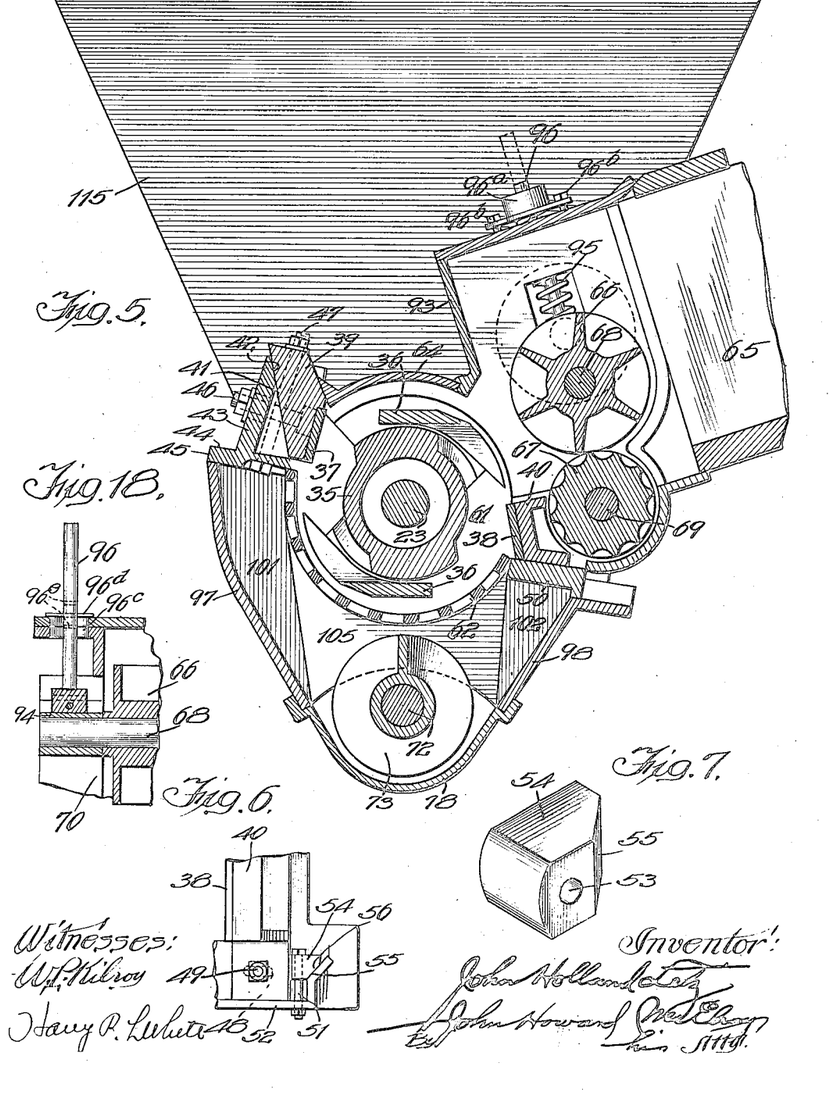
Fig. 5 is a view in section on the line 5—5 of Fig. 1, but on a larger scale.
Fig. 6 is a detail showing the means for the adjustment of one of the cutter bars.
Fig. 7 is an enlarged perspective view of the adjusting block shown in Fig. 6.
Fig. 18 is a detail showing a bearing for the upper feed roll.

The shaft 23 is journaled at its right hand end in the bearing 30, preferably adjustably supported, as shown, in the auxiliary bearing stand 31 supported on the legs 32, and carries the fly-wheel 33 and the belt wheel 34 by which it is driven adjacent said bearing. It has secured thereon the hollow, generally cylindrical cutter head casting 35, which, as best seen in Fig. 5, has bolted on the periphery thereof a pair of helical cutting blades 36, which shear against the pair of cutter bars 37 and 38 screwed or otherwise secured to the supporting bars 39 and 40. The bar 39 is adjusted to and from the cutter head by reason of its inclined rear face 41 co-operating with the similarly inclined edges of the triangular flanges 42 formed near the ends of the flange or abutment 43 projecting upwardly and somewhat rearwardly from the substantially horizontal web 44 of the frame casting 45, seen in top plan view in Fig. 16 and in end elevation in Fig. 12. The bar 39 is held in the desired adjustment by the two sets of bolts 46 and 47 crossing each other at right angles and passing through suitable apertures in the bar and its abutment 43. The bar 40 (see Fig. 6) is provided at each end with the transversely elongated vertical slots 48 through which passes the bolt 49 extending through said slots and an aperture in the substantially horizontal web 50 of the casting 45. It is held forward by the bolts 51 (see Figs. 6 and 7) passed through apertures in lugs 52 projecting up at the ends of the web 50 and through apertures 53 in the abutment blocks 54 having inclined faces 55 co-operating with the correspondingly inclined face 56 of the extension of the lugs 52.

The shaft 23 is also journaled in the co-operating half bearings 57 and 58 in the ends of the casting 45 and in the end castings 59, one of which is seen in side elevation in Fig. 11. These substantially semicircular portions 60 of the end castings 59 and the semi-circular portions 61 of the casting 45 form the ends of the generally cylindrical concave in which the cutter head rotates, the bottom of which concave is formed by the substantially semicircular screen plate 62, seen in end elevation in Fig. 13, and the ends of which fit between the semicircular ends 61 of the casting 45 and the semicircular recessed flanges 63 projecting up from the top of the casting 20. This screen plate 62 may be of the same construction as the similar plate described and claimed in my application No. 186,091, filed August 14, 1917. The top of the concave for the cutter head is formed by the curved plate 64, seen in cross section in Fig. 5 and extending between and connecting the end castings 59. A feed trough 65 of customary construction is connected to the end castings 59. A pair of feed rollers 66 and 67 secured on the shafts 68 and 69 journaled in sliding bearing boxes in the rectangular recesses 70, and in the fixed bearing 71, respectively, in the end castings 59, serve to feed the material to the cutter head, and to drive these feed roller shafts 68 and 69 and the shaft 72 of the helical conveyor 73 at the proper speed from the shaft 23, I employ the gearing seen in Figs. 1 to 4.

Figure 2:
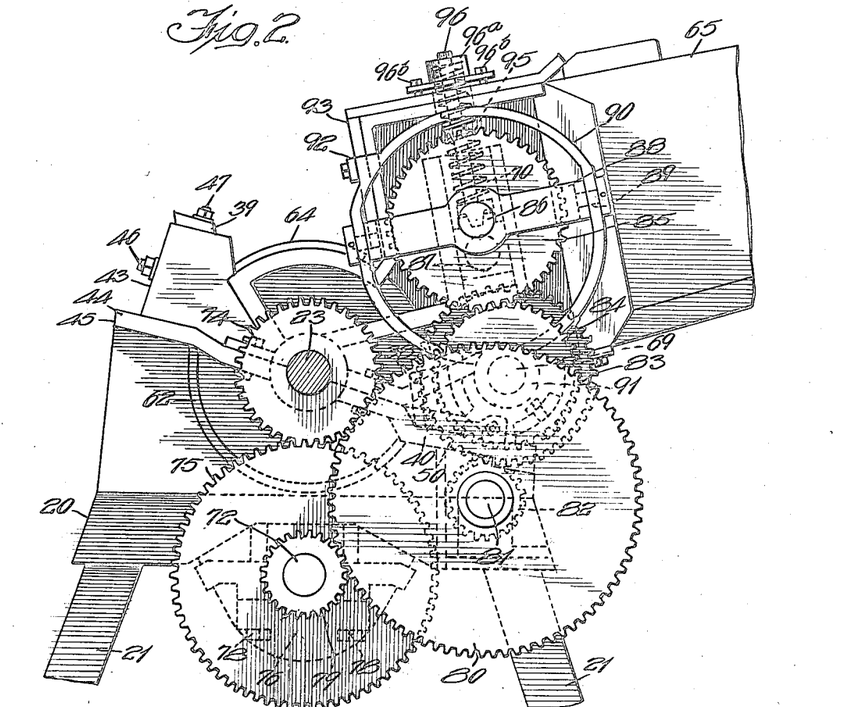
Fig. 2 is a section on the line 2—2 of Fig. 1, but on an enlarged scale.
Figure 3:
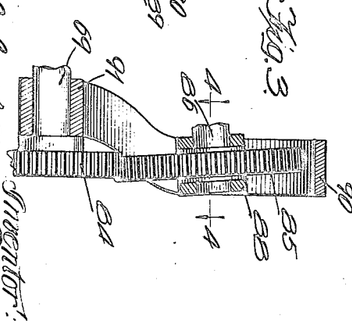
Fig. 3 is a detail in section on the line 3—3 of Fig. 2.
Figure 4:
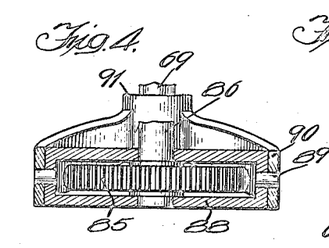
Fig. 4 is a detail in section on the line 4—4 of Fig. 3.

A spur gear pinion 74 on the shaft 23 meshes with the spur gear wheel 75 secured on the shaft 72, which I preferably provide with the ball and socket bearing 76 at one end and with the ball and cylindrical bearing 77 at the other end. The lower halves of these bearings 76 and 77 are formed in the ends of the conveyor trough casting 78 bolted on to the under side of that end of the casting 20. The shaft 72 has secured on its right hand end a spur gear pinion 79 meshing with a spur gear wheel 80 mounted on a stub shaft 81 projecting from that end of the framework, and having the spur gear pinion 82 secured on its hub and meshing with the spur gear wheel 83 secured on the shaft 69 of the lower feed roll 67. Another spur gear wheel 84 secured on the end of the shaft 69 meshes with a crowned gear wheel 85 secured on the end of the section 86 of the shaft 68, to which it is connected by the universal joint 87. The end of the shaft 86 is journaled in the bearing 88 which takes the form of a yoke embracing wheel 85 and pivoted at its ends by the pins 89 in suitable apertures in the yoke 90, which is generally circular in outline, as seen in Fig. 2, and has its lower end provided with the bearing ring 91 in which is journaled the lower feed roll shaft 69, as seen in Fig. 3. The upper end of the yoke 90 is supported by the bar 92, seen in Fig. 1, bolted thereto, and likewise bolted to the front piece 93 of the generally rectangular feed roll casing seen in cross section in Fig. 5. The slide bearings 94, seen in Figs. 8 and 18, for the feed roll shaft are held downward in their bearing slots 70 by the helically coiled expanding spring 95 surrounding the pin 96 passed through an aperture in the top of the feed roll casing and having its lower end pinned to the slide bearing box 94. The top of the spring 95 is engaged by the cap plate 96$^a$ which may be adjusted to and from the casing by the set screws 96$^b$ to vary the tension of the springs 96 and the grip of its feed rolls. When ear corn is to be fed, I preferably remove the screws 96$^b$, the plates 96$^a$, and the springs 96, through the aperture 96$^c$ in the top casing, and then lift up the feed roll 66 enough so the ear corn can pass between them easily, and then secure it in said lifted position by the pins 96$^d$ passed through the proper ones of a plurality of apertures 96$^e$ formed in the rods 96.

Figure 8:
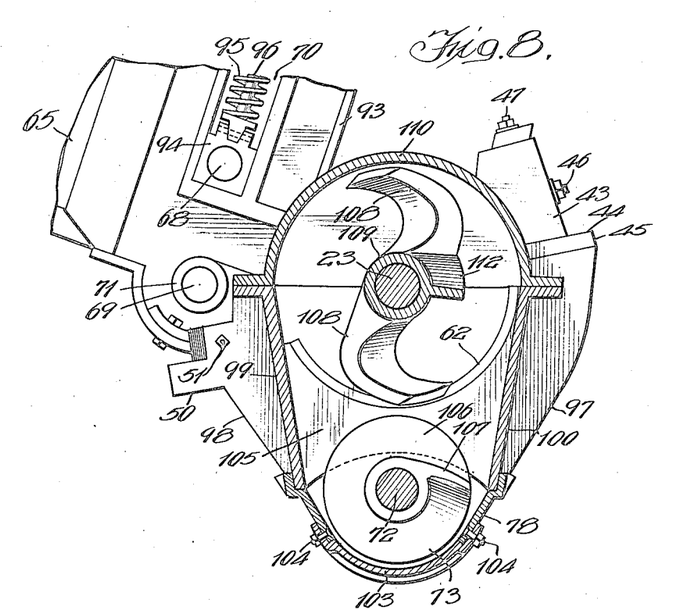
Fig. 8 is a section on a larger scale on the line 8—8 of Fig. 1.

As best seen in Figs. 5, 8 and 17, the trough for the conveyor 73 has the right-hand three-quarters of it made up of the bottom 78 and the flaring side portions 97 and 98 of the casting 20, while the left quarter is made up of said bottom 78 and the less flaring side portions 99 and 100, which are connected to the side portions 97 and 98 by the offsets 101 and 102 seen in Fig 5. In said left-hand quarter, the bottom 78, as seen in Fig. 8, is provided with a removable section 103 secured in place by the bolts and nuts 104, so that in case no grinding, as distinguished from cutting, is desired, the door or section 103 can be removed and the cut hay or fiber discharged at this point, without further action on it by the machine. Extending into the trough in the vertical plane of the offsets 101 and 102 is a separating plate 105, with its concavely curved upper edge contacting with the end of the screen 62, while its concave edge forms an arch over the shaft 72, the flange of the conveyor 73 being interrupted at this point to allow the plate to approach the shaft 72 and prevent the material flowing backward, as it would tend to do when it is being lifted beyond the plate 105.

Figure 9:
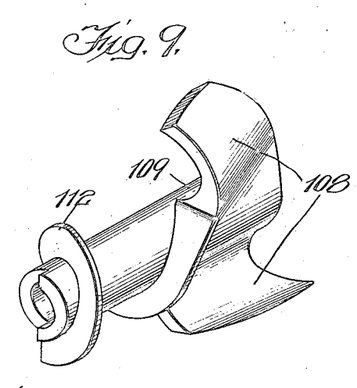
Fig. 9 is a perspective view of an elevating hook.
Figure 10:
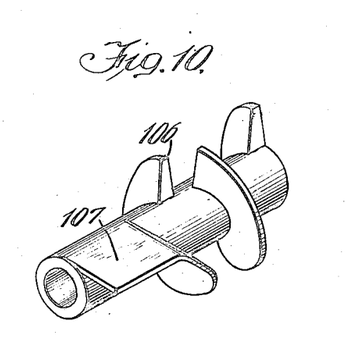
Fig. 10 is a perspective view of one end of a worm conveyor showing the lifting flange thereon.
Figures 10, 16:
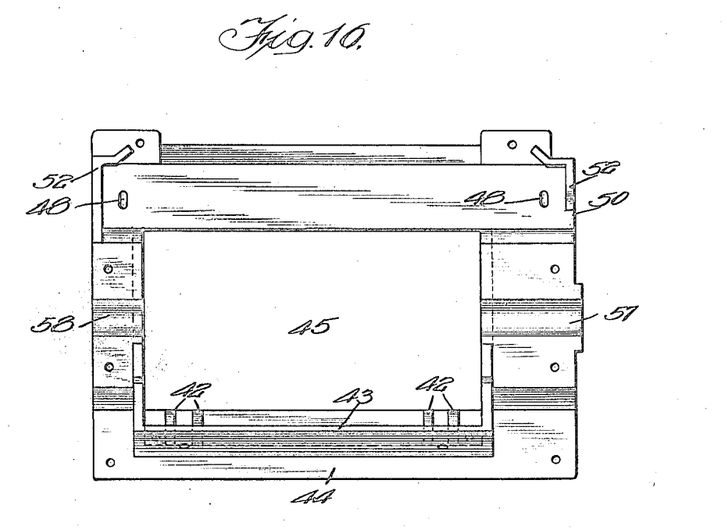
Fig. 16 is a top plan view of the casting seen in Fig. 12.

The conveyor flange between the plate 105 and the adjacent end of the trough is seen in perspective in Fig. 10, and consists of the short helical portion 106, which has the ordinary screw function, terminating in a flat portion 107 extending tangentially from the hub and parallel to the axis of the shaft. This portion 107 serves to lift the cut material substantially into the horizontal plane of a pair of hooks 108, seen in perspective in Fig. 9, and extending from the hub portion 109 secured on the shaft 23. The hooks 108 are slightly inclined so as to throw the material lifted thereby toward the burr end of the machine. The casting 20 has bolted on it to cover the hooks 108, a boss 110, the main portion of which is semicircular in cross-section and approaches closely to the path of the ends of the hooks 108. An extension 111 slants downward and inward to produce a truncated semiconical portion which terminates close to the helical screw flange 112 formed on the hub 109 and co-operating with the material lifted by the hooks 108 to the short trough-like portion 113 of the casting 20. A flange 114 between the portions 110 and 111 serves as a seat for that end of the sheet metal hopper 115 secured at its bottom to the webs 116 of the casting 20, and having its other end secured to the burr casing 27. A breaking concave 116 is bolted to the bottom of that end of the casting 20, over the rectangular opening 117 in the bottom thereof between the narrow faces 118 constituting a part of the concave structure. From the helical flange 112 to the auger 119, which forces the material into the burr casing through the customary receiving aperture, the size of which is regulated by the adjustable feed plates 120 and 121, the shaft 23 carries two breaking and feed sleeves 122 having the helically disposed ribs 123 co-operating with the material and the concave to break up the material, if necessary, and feed it to the burr casing, where it is ground.

The operation of the complete apparatus will now be readily apparent. If alfalfa or some similar material needing cutting is to be handled, it is fed into the chute 65 and is carried by the feed rolls 66 and 67 across the cutter bar 38 on which it is sheared into short sections by the rapidly rotating helical knives 36. So much of the hay as is cut into the proper lengths, i. e., so much of it as has its stalks standing at right angles to the length of the bar 38 in passing it is forced or falls through the apertures in the screen plate 62 to the conveyor trough beneath. Such of it as is too long, i. e., that which passes diagonally across the cutter bar is carried past the screen and is sheared between the knives 36 and the cutter bar 37, the large sleeve 35 of the supporting casting for the knives preventing its wrapping about the cutter head and the rapid movement throws the material out tangentially and carries it repeatedly past the cutter bars 38 and 37 as often as is necessary to insure its being cut to the short lengths necessary to pass through the perforations in the screen 62. If the material is simply to be cut, the door 103 is removed, and the conveyor 73 carries the cut material to said door through which it drops.

If it is to be ground, the door 103 is put in place, and the cut material reaching it is lifted by the flange 107 into the path of the hooks 108, which lift the material and throw it into the path of the screw conveyor 112 which carries it through the passage formed beneath the casing 110, 111, into the crushing concave 116. The projections 123 carry it onto the auger 119 which delivers it into the burr casing 27, where it is ground to a degree of fineness depending on how closely the burrs are set.

If it is desired to grind some material such for instance as threshed oats, which needs no cutting, they are dumped into the hopper 115 and fed by the projections 123 and the auger 119 at the proper rate into the burr casing 27. Under these conditions, the rotating screw 112 in the passage beneath the casing 110, 111, acts as a seal to prevent the oats from flowing backward and down into the conveyor trough 78.

While I have shown and described my invention as embodied in the form which I at present consider best adapted to carry out its purposes, it will be understood that it is capable of modifications, and that I do not desire to be limited in the interpretation of the following claims except as may be necessitated by the state of the prior art.

What I claim as new and desire to secure by Letters Patent of the United States is:

1. In an apparatus of the class described, the combination with a shaft, of a cutter head secured thereon towards one end of the shaft, a concave surrounding said cutter head, said concave being provided with a receiving aperture on one side and a plurality of fine discharge apertures in its bottom, a trough beneath said bottom into which the cut material is discharged, a longitudinal conveyor for said trough, a second concave beneath the shaft toward the other end from the cutter head, a conveyor secured on the shaft in the second concave, and means to lift the cut material from the discharge end of the trough into the adjacent end of the second concave.

2. In an apparatus of the class described, the combination with a shaft, of a cutter head secured thereon towards one end of the shaft, a concave surrounding said cutter head, said concave being provided with a receiving aperture on one side and a plurality of fine discharge apertures in its bottom, a trough beneath said bottom into which the cut material is discharged, a longitudinal conveyor for said trough, a second concave beneath the shaft toward the other end from the cutter head, a conveyor secured on the shaft in the second concave, and means carried by said shaft to lift the cut material from the discharge end of the trough into the adjancent end of the second concave.

3. In an apparatus of the class described, the combination with a shaft, of a cutter head secured thereon towards one end of the shaft, a concave surrounding said cutter head, said concave being provided with a receiving aperture on one side and a plurality of fine discharge apertures in its bottom, a trough beneath said bottom into which the cut material is discharged, a longitudinal conveyor for said trough, a second concave beneath the shaft toward the other end from the cutter head, a conveyor secured on the shaft in the second concave, and a hook having an inclined face carried by said shaft for lifting the cut material from the discharge end of the trough into the adjacent end of the second concave.

4. In an apparatus of the class described, the combination with a shaft, of a cutter head secured thereon towards one end of the shaft, a concave surrounding said cutter head, said concave being provided with a receiving aperture on one side and a plurality of fine discharge apertures in its bottom, a trough beneath said bottom into which the cut material is discharged, a helical conveyor for said trough terminating at its discharge end in a flattened lifting portion, a second concave beneath the shaft toward the other end from the cutter head, a conveyor secured on the shaft in the second concave, and a hook having an inclined face carried by said shaft lifting the cut material carried up to it by the flattened lifting portion of the helical conveyor.

5. In an apparatus of the class described, the combination with a shaft, of a cutter head secured thereon towards one end of the shaft, a concave surrounding said cutter head, said concave being provided with a receiving aperture on one side and a plurality of fine discharge apertures in its bottom, a trough beneath said bottom into which the cut material is discharged, a counter-shaft journaled in said trough, gearing from the shaft to the counter-shaft, a screw conveyor on the counter-shaft, a second concave beneath the shaft toward the other end from the cutter head, a conveyor secured on the shaft in the second concave, and means to lift the cut material from the discharge end of the trough into the adjacent end of the second concave.

6. In an apparatus of the class described, the combination with a shaft, of a cutter head secured thereon towards one end of the shaft, a concave surrounding said cutter head, said concave being provided with a receiving aperture on one side and a plurality of fine discharge apertures in its bottom, a trough beneath said bottom into which the cut material is discharged, a counter-shaft journaled in said trough having spherical bearings, gearing from the shaft to the counter-shaft, a screw conveyor on the counter-shaft, a second concave beneath the shaft toward the other end from the cutter head, a conveyor secured on the shaft in the second concave, and means to lift the cut material from the discharge end of the trough into the adjacent end of the second concave.

7. In an apparatus of the class described, the combination with a trough, of a screw conveyor therein, a comminuting concave at the discharge end of the trough but at a higher level, a conveyor in the concave, co-operating therewith in its comminuting action and means to lift material from the discharge end of the trough into the receiving end of the concave.

8. In an apparatus of the class described, the combination with a trough, of a screw conveyor therein, a comminuting concave at the discharge end of the trough but at a higher level, a conveyor in the concave co-operating therewith in its comminuting action, means to lift material from the discharge end of the trough into the receiving end of the concave, and a partition in the upper part of the trough near the discharge end to prevent rearward movement of the material in the top of the trough.

9. The combination with a trough, of a conveyor therein, a comminuting concave at the discharge end of the trough but at a higher level, a screw conveyor in the concave, co-operating therewith, in its comminuting action, and a hook having an inclined face carried by the screw conveyor beyond the end of the concave.

10. The combination with a trough, of a conveyor therein, a comminuting concave at the discharge end of the trough but at a higher level, a screw conveyor in the concave co-operating therewith in its comminuting action, a hook having an inclined face carried by the screw conveyor beyond the end of the concave, and a partition in the upper part of the trough just beyond the hook to prevent rearward movement of the material in the top of the trough.

11. In an apparatus of the class described, the combination with a trough, of a screw conveyor therein, a comminuting concave at the discharge end of the trough but at a higher level, a screw conveyor in the concave co-operating therewith in its comminuting action, a hook having an inclined face carried by the screw conveyor in the concave beyond the end thereof, the screw conveyor section in the trough below the hook having its flange beneath the hook parallel to the axis of the conveyor, for the purpose described.

12. In an apparatus of the class described, the combination with a trough, of a screw conveyor therein, a comminuting concave at the discharge end of the trough but at a higher level, a screw conveyor in the concave co-operating therewith in its comminuting action, a hook having an inclined face carried by the screw conveyor in the concave beyond the end thereof, the screw conveyor section in the trough below the hook having its flange beneath the hook parallel to the axis of the conveyor, and a partition in the upper part of the trough adjacent the hook to prevent rearward movement of the material in the top of the trough, for the purpose described.

13. The combination with a main shaft, of a cutter head secured thereon, a worm conveyor shaft below said cutter head, spur-gearing connecting the two shafts, a spur-gear pinion on the worm conveyor shaft, a spur-gear wheel meshing with said pinion and having a second spur-gear pinion on its hub, a feed roll shaft, a spur-gear wheel thereon meshing with the second spur-gear pinion, a second feed roll shaft, and gearing between the two feed roll shafts that permit relative movement to and from each other along the plane connecting their axes.

14. The combination with a main shaft, of a cutter head secured thereon, a worm conveyor shaft below said cutter head, spur-gearing connecting the two shafts, a spur-gear pinion on the worm conveyor shaft, a spur-gear wheel meshing with said pinion and having a second spur-gear pinion on its hub, a feed roll shaft, a spur-gear wheel thereon meshing with the second spur-gear pinion, a second feed roll shaft, and gearing between the two feed roll shafts that permits relative movement to and from each other along the plane connecting their axes, said gearing consisting of a gear wheel on the first shaft meshing with a crowned gear wheel on the second shaft journaled in a bearing swivelled in said annular casing on an axis at right angles to the plane passing through the axes of the two shafts.

15. In an apparatus of the class described, a frame comprising a pair of slotted-bearing end castings, a co-operating rectangular casting with semicircular ends, a screen plate semicircular in cross-section co-operating with said semicircular ends, a main standard casting with semicircular recesses in its ends to receive the semicircular screen plate and having an open bottom, and a concave screw conveyor casting secured to said open bottom.

16. In an apparatus of the class described, a frame comprising a pair of slotted-bearing end castings, a co-operating rectangular casting with semicircular ends, a screen plate semicircular in cross-section co-operating with said semicircular ends, a main standard casting with semicircular recesses in its ends to receive the semicircular screen plate and having an open bottom, a concave screw conveyor casting secured to said open bottom, said main standard casting having the concave extension therefrom, and a hopper secured to said main casting above the concave extension.

17. In an apparatus of the class described, the combination with a shaft, of a cutter head secured thereon towards one end of the shaft, a concave surrounding said cutter head, said concave being provided with a receiving aperture on one side and a plurality of fine discharge apertures in its bottom, a trough beneath said bottom into which the cut material is discharged, a second concave beneath the shaft toward the other end from the cutter head at a higher level than the trough, comminuting and conveying elements on the shaft co-operating with said second concave, and a conveyor in said trough adapted to discharge into the second concave.

18. In a grinding machine, the combination with a concave, of a hopper thereover, grinding burrs at the end of the concave, a casing for the screw conveyor at the other end of the concave, said casing having openings at both ends larger than the screw extending therethrough but closed elsewhere, a shaft in the concave carrying one of the burrs, and a single screw on the shaft in said casing extending through both of said open ends so that the screw carries the material into and through the casing, substantially as and for the purpose described.

19. In an apparatus of the class described, the combination with a shaft, of a cutter head secured thereon towards one end of the shaft, a concave surrounding said cutter head, said concave being provided with a receiving aperture on one side and a plurality of fine discharge apertures in its bottom, a trough beneath said bottom into which the cut material is discharged, a longitudinal conveyor for said trough, a second concave beneath the shaft toward the other end from the cutter head, a crushing and cutting conveyor secured on the shaft in the second concave, means to lift the cut material from the discharge end of the trough into the adjacent end of the second concave, a casing for a screw at said adjacent end of the second concave open at both ends, and a screw on the shaft in said casing.

20. In a feeding mechanism, the combination with a lower feed roll journaled in stationary bearings, of an upper feed roll journalled in sliding bearings, rods connected to said upper bearings and extending through the apertures in the top of the casing, helically coiled expanding springs surrounding the rods and extending through the apertures, cap plates covering the apertures and through which the rods pass, and screws to adjust the cap plate to and from the casing.

21. In a feeding mechanism, the combination with a lower feed roll journaled in stationary bearings, of an upper feed roll journalled in sliding bearings, rods connected to said upper bearings and extending through apertures in the top of the casing, said rods having transverse apertures therethrough, helically coiled expanding springs surrounding the rods and extending through the apertures in the casing, cap plates through which the rods pass covering the apertures, screws to adjust the cap plates to and from the casing, and pins to be placed in said transverse apertures to hold up the upper feed roll when the springs and cap plate are removed.

22. In an apparatus of the class described, the combination with a shaft, of a cutter head secured thereon toward one end of the shaft, a cutter element co-operating with the cutter head, a receptacle below the cutter head into which the cut material is discharged, a concave located beneath the shaft but on a higher level than the receptacle, a conveyor in the concave, and means to lift the cut material from the receptacle to the level of and into the concave.

23. In an apparatus of the class described, the combination with a shaft, of a cutter head secured thereon toward one end of the shaft, a cutter element co-operating with the cutter head, a receptacle below the cutter head into which the cut material is discharged, a concave located beneath the shaft but on a higher level than the receptacle, a conveyor in the concave, and hooks secured to the shaft to lift the cut material from the receptacle to the level of and into the concave.

24. In an apparatus of the class described, the combination with a shaft, of a cutter head secured thereon toward one end of the shaft, a cutter element co-operating with the cutter head, a receptacle below the cutter head into which the cut material is discharged, a conveyor shaft in said receptacle, a concave located beneath the main shaft but on a higher level than the receptacle, a conveyor in the concave, and a tangential flange on the conveyor shaft to lift the cut material from the receptacle to the level of and into the conveyor.

25. In an apparatus of the class described, the combination with a shaft, of a cutter head secured thereon toward one end of the shaft, a cutter element co-operating with the cutter head, a receptacle below the cutter head into which the cut material is discharged, a concave located beneath the shaft but on a higher level than the receptacle, a conveyor in the concave, a conveyor shaft in said receptacle, and hooks and a tangential flange carried by the conveyor shaft to lift the cut material from the receptacle to the level of and into the concave.

26. In a device of the class described, the combination with a cylindrical casing having a feed opening thereinto, of an arcuate screen plate adjacent the feed opening, forming a part of the casing, which casing is closed except for the feed opening and those in the screen plate, and a cutter head journaled concentrically with the screen plate and having cutting blades secured to the head, said cutter head having a central body portion connecting the blades and acting to propel the material in the casing thrown outward by centrifugal action to keep it passing over the screen plate in the path of the cutting edges of the blades until it is fine enough to escape through the screen plate, substantially as and for the purpose described.

27. In a device of the class described, the combination with a generally cylindrical casing, having a feed opening thereinto, of an arcuate screen plate adjacent the feed opening, and having apertures therein, a pair of cutter bars, one adjacent to each opposite edge of the screen, the screen plate and cutter bars forming a part of the casing, which is closed except for the feed opening and the apertures in the screen plate, and a cutter head journaled concentrically with the screen plate and having cutting blades secured to the head, the cutter head having a central body portion connecting the blades and acting to propel the material in the casing thrown outward by centrifugal action to keep it passing over the screen plate in the path of the cutting edges of the blades until it is fine enough to escape therethrough, substantially as and for the purpose described.

In witness whereof I have hereunto set my hand and affixed my seal this 30th day of July, A. D. 1919.

JOHN HOLLAND LETZ. [L. S.]

Witness:
JOHN HOWARD MCELROY.